United States Patent [19]

Fisler

[11] 4,426,736

[45] Jan. 17, 1984

[54] PROGRAMMABLE CLOCK RADIO HAVING NAP AND SLEEP TYPE FEATURES

[75] Inventor: Charles F. Fisler, New Hartford, N.Y.

[73] Assignee: General Electric Company, New York, N.Y.

[21] Appl. No.: 387,484

[22] Filed: Jun. 11, 1982

[51] Int. Cl.³ .............................................. H04B 1/16
[52] U.S. Cl. ....................................... 455/231; 368/10
[58] Field of Search ....................... 455/171, 181, 231; 368/10, 156

[56] References Cited

U.S. PATENT DOCUMENTS

| 3,686,878 | 8/1972 | Patrick et al. |
|---|---|---|
| 3,825,836 | 7/1974 | Pyles ................................. 455/231 |
| 3,888,075 | 6/1975 | Wecker .............................. 455/231 |
| 3,900,798 | 8/1975 | Pomerantz et al. ................. 455/231 |
| 4,187,468 | 2/1980 | Kao .................................... 455/231 |

Primary Examiner—Jin F. Ng
Attorney, Agent, or Firm—Leonard J. Platt; George R. Powers; John F. Cullen

[57] ABSTRACT

An electronic circuit, capable of being fabricated as an integrated circuit, for inclusion within a programmable radio for providing the radio with sleep and nap type functional operations. The electronic circuit includes a radio circuit coupled to a control circuit having a timing circuit, a time set circuit, a manually operated switch and a circuit coupling. The circuit couples the timing circuit, the manually operated switch and the time set circuit to the radio circuit to supply the radio circuit with first and second signals when the coupling circuit is in a first state and to prevent or block the first and second signals from being supplied to the radio circuit when the coupling circuit is in a second state.

11 Claims, 1 Drawing Figure

PROGRAMMABLE CLOCK RADIO HAVING NAP AND SLEEP TYPE FEATURES

FIELD OF THE INVENTION

This invention relates to programmable clock radios having nap and sleep type features included therein and more particularly to a fully electronic circuit which can advantageously be fabricated by integrated circuit techniques for providing nap and sleep type feature control of a radio circuit.

BACKGROUND OF THE INVENTION

With the advent of microprocessors, consumer oriented radio products have been offering an increasing number of features to further enhance the utility and desirability of the radio products. Standard features on these radios include a sleep, alarm, repeat alarm, and nap functions. The sleep function generally turns the radio on for a predetermined period of time generally between one and sixty minutes. The alarm function turns the radio and/or a buzzer on at a predetermined hour and the alarm generally continues for a predetermined length of time generally between one and sixty minutes. The repeat alarm function is activateable only during the alarm function and causes the alarm to be temporarily suspended for a predetermined period of time, generally between one and twenty minutes, after which the alarm reactivates to for instance reawaken a sleeper after an additional 40 winks. The nap function is useable when the radio is operating in its on mode and causes the radio operation to be suspended for a predetermined period of time, generally between one and sixty minutes, after which the radio reverts to its previously ON condition.

These feature functions have been implemented by a variety of electronic and mechanical embodiments. U.S. Pat. No. 4,187,468, Electronic Clock Having Nap/Sleep Feature, discloses the use of a manually operable switch S3 to switch a clock radio between a sleep controller and a nap controller. Such a switch is not includeable within an integrated circuit. Such switch requires three integrated circuit output pins for its implementation, an expensive construction. Additionally, that circuit indicates that transistor $Q_1$ is s nap power source and switch S3 must be moved to position 16 to achieve a sleep type function and moved to position 17 to achieve a nap type function. With switch S3 in position 17, and a high output from clock terminal 12, the radio operation is inhibited. In this circuit, this condition can occur not only when the nap time period is selected but also when the sleep feature is selected and switch S3 remains in position 17. Merely positioning switch S3 to position 17, does not ensure that transistor $Q_1$ will be exclusively operated by nap signals alone but instead would allow a mistakenly entered sleep command to deactivate the radio. Further, that circuit does not disclose a control which allows a user to turn the radio on or off and does not disclose a control which allows the user to exit the sleep mode and turn the radio on.

SUMMARY OF THE INVENTION

The present invention provides for a programmable clock radio by incorporating a fully electronic programmable circuit in a radio circuit to permit programmable control of the radio circuit. In a preferred embodiment, the fully electronic circuit provides separate controls dedicated to activate the circuit for separate nap and sleep type operations. The electronic circuit requires only one additional integrated circuit pin to implement the nap function and this circuit is therefore attractive for integrated circuit applications.

In a preferred embodiment, the present invention provides a programmable clock radio having a radio circuit which is operated through a control means. The control means supplies a control signal of a predetermined polarity and magnitude to the input terminal of the radio circuit for causing the radio circuit to receive power and operate. The control means generally includes a timing means, having an input means for selectively setting a time period and an output means for providing a first signal for a preselected period of time. The control means also includes a manually operated ON/OFF switch having a first terminal adapted for connection to a power supply and a second terminal coupled to the input terminal of the radio circuit for supplying a second signal and causing the radio to operate when the switch is in its closed or ON position. The control means also includes a circuit means which couples the timing means and the manually operated switch to the radio circuit. The circuit means is operable in first and second states and in its first state it is adapted to supply any first or second signal that is being generated to the radio circuit as a control signal to cause the radio circuit to operate. In its second state, the circuit means is adapted to block or divert any first or second signal that is being generated from being supplied to the radio circuit to prevent those signals from otherwise causing the radio circuit to operate. More particularly, in its second state the circuit means can suspend the operation of the radio for a predetermined period of time. The control means further includes a manually operated time set means having a first means coupled to the circuit means and to the timing means for establishing a time period during which the timing means provides a first signal and for causing the circuit means to at least momentarily assume its second state which can thereafter be maintained by the subsequent generation of a first signal by the timing means. When the circuit means is in its second state, signals provided by the manually operated switch as well as the timing means cannot be supplied to the radio circuit to cause it to operate.

In a preferred embodiment, manually operated time set means also includes a second means coupled to the timing means for independently establishing a time period during which the timing means provides a first signal. This second time set means does not cause the circuit means to at least momentarily assume a second state. In a preferred embodiment, the circuit means generally includes a first circuit for coupling the timer output to the radio circuit input, a second circuit for coupling the manually operated switch to the radio circuit input, a first means for diverting or sinking signals from the radio circuit input and second means for sinking or diverting signals from the first means for sinking or diverting signals. In operation, to achieve a sleep type function, the timing means is set to a preselected time period and provides a first signal at its output which is supplied by the first circuit means to the radio circuit input and causes the operation thereof. For normal ON type operation, the manually operated switch is closed supplying a second signal via the second circuit means to the radio circuit input causing the radio circuit to operate. For nap type operation, the first means of the time set means is activated (i) to set a time period during which the timing means will provide a first signal and (ii) to at least momentarily cause the circuit means to assume its second state whereby the second sinking or diverting means is shorted thus allowing the first sinking or diverting means to respond to first signal supplied by the timing means to permit the first sinking or diverting means to short the input terminal of the radio circuit preventing signals otherwise applied to the radio circuit input terminal from operating the radio. In its second state, the circuit means thus suspends the otherwise normal operation of the radio. At the conclusion of the selected time period, the first signal ceases and the first means for sinking or diverting signals no longer sinks or diverts signal from the radio circuit input or the second means for diverting or sinking signals, and accordingly the second means for sinking or diverting signals is permitted to respond to signals otherwise supplied to the radio circuit input terminal and prevent the first means for sinking or diverting signals from becoming active in the presence of a first signal. In a preferred embodiment, the second means for sinking and diverting signals is biased to insure that as between the first and second means for sinking signals, the second means for sinking signals will become active first.

In a preferred embodiment, a first transistor is used to couple the radio circuit to a power supply with the base of the first transistor acting as the radio circuit input terminal. Circuit means includes second and third transistors configured in a latch type circuit wherein a control terminal of the second transistor is coupled to the timing means and the other two terminals of that transistor couple the radio circuit input terminal to ground. The third transistor includes a control terminal connected to the radio circuit input terminal with its other two terminals being adapted for shorting the first transistor. The time set first means also controllably couples the control terminal of the second transistor to ground.

The electronic circuit of the present invention is also useable to implement other function features similar to the nap or sleep type feature wherein the radio is either disconnected or connected to a power supply according to the occurrence of a signal of a predetermined polarity and magnitude either alone or in combination with a start signal. The electronic circuit of the present invention is particularly useful for including a nap/sleep type function feature within an integrated circuit package and more particularly for including the electronic circuit of the present invention within a timer integrated circuit package.

Further objects and features and a more complete understanding of the present invention which will admit to a number of possible variations will be seen from the following detailed description which taken in conjunction with the attached drawings represents the preferred embodiments of this invention.

BRIEF DESCRIPTION OF THE DRAWING

The inventive idea disclosed herein is capable of receiving a variety of electrical expressions, the accompanying drawing is included for the purpose of illustrating a particular embodiment of this inventive idea and is not intended to be limiting on the scope thereof. In this drawing.

DETAILED DESCRIPTION OF THE DRAWINGS

Figure 1:
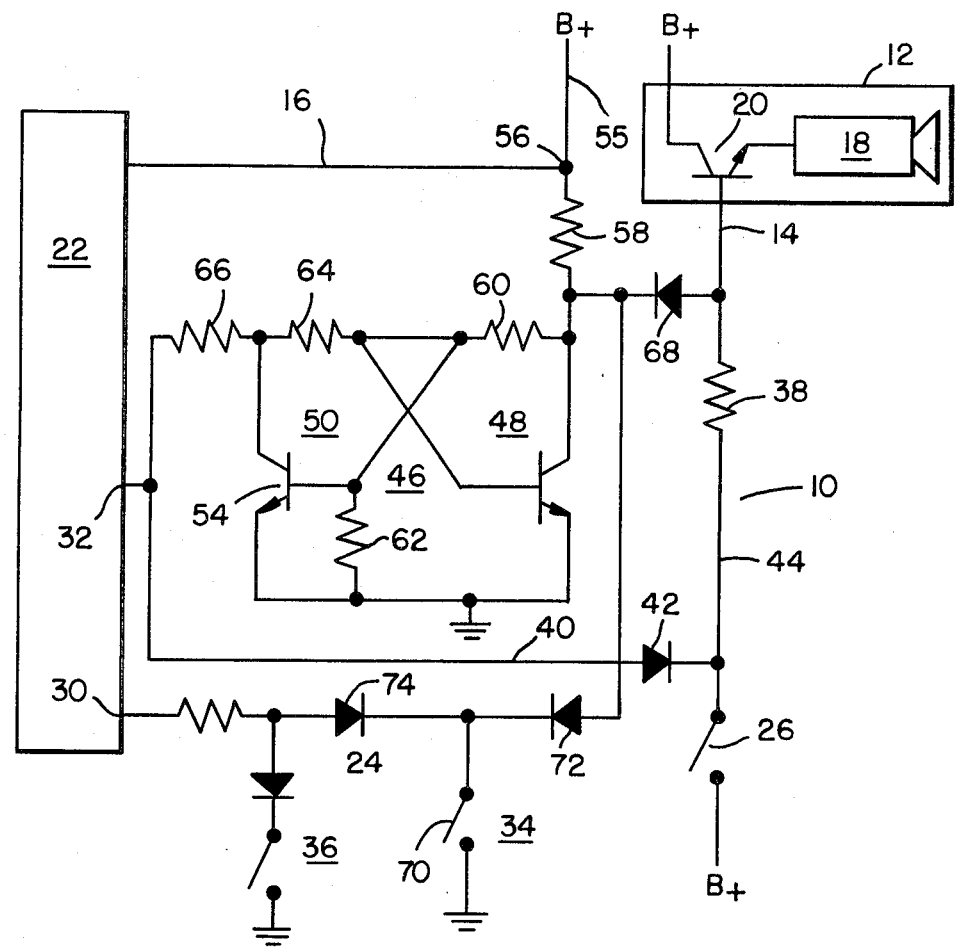
FIG. 1 is a schematic circuit diagram illustrative of an electronic circuit in accordance with the present invention.

One embodiment of a programmable clock radio in accordance with the present invention is illustrated in FIG. 1 wherein the programmable clock radio generally designated 10 is shown to comprise a radio circuit means 12 having an input terminal 14 and control means 16 coupled to the input terminal 14 of the radio circuit means 12. The radio circuit means 12 includes a radio circuit 18 and a first transistor 20. The first transistor 20 has a first terminal coupled to the input terminal 14 of the radio circuit input means 12, a second terminal coupled to the radio circuit 18 and a third terminal adapted for coupling to a source of power. The radio circuit 18 is supplied with power and caused to operate only when a control signal of predetermined polarity and magnitude is supplied to the input terminal 14 of the radio circuit means 12. More particularly, the radio circuit means 12 operates only when it receives a control signal of predetermined polarity and magnitude which is sufficient to forward bias the first transistor 20 to enable the first transistor 20 to supply power to the radio circuit 18 to permit the radio circuit 18 to operate.

The control means 16 is coupled to the input terminal 14 of the radio circuit means 12. The control means 16 controls the operation of the radio circuit 18 by selectively supplying a control signal to the radio circuit input terminal 14 in accordance with the wishes of the user.

The control means 16 includes a timing means 22, a manually operated time set means 24, a manually operated ON/OFF switch means 26 and a circuit means 28. The timing means 22 includes an input means 30 and an output means 32. The timing input means 30 permits the user to select or set a time period generally between one and fifty nine minutes during which the output means 32 of the timing means 22 will provide a first signal of a predetermined polarity and magnitude. As known to those skilled in the art, the timing means 22 can be set by providing a predetermined potential such as ground to the set input means 30 of the timing means for causing the timing means 22 to count down from a predetermined value to a selected value representative of the time period desired by the user. Other or more sophisticated timing means 22 such as a microprocessor capable of being programmed for a plurality of different time intervals to provide a plurality of signals of a first polarity and magnitude for a plurality of different time intervals and permitting these signals to be selectively recalled by for instance entering an appropriate instruction are equally usable in accordance with the present invention to provide a timing means 22 which supplies at its output means 32 a first signal of a predetermined polarity and magnitude, for a time duration equal to the selected time period.

The illustrated embodiment of the present invention can for instance include a time set means 24 such as a switch having a first terminal adapted for connection to a prespecified potential such as ground and a second terminal connected to the time set input means 30 of timing means 22. The time set means 24 includes first means and second means 34 and 36 respectively which can advantageously be respectively dedicated for establishing time periods for nap type and sleep type functions.

The time set means 24 first means 34 as will be explained below can advantageously also include means for at least momentarily causing the circuit means to assume a second state or for initiating a nap type function.

The manually operated ON/OFF switch 26 is normally open and includes a first terminal adapted for connection to a source of power and a second terminal coupled through a current limiting resistor 38 to the input terminal 14 of the radio circuit means 12. When switch 26 is open, it does not supply signals to the input terminal of the radio circuit means 12 and accordingly open switch 26 does not supply a second signal to cause the first transistor 18 to become forward biased to supply power to the radio circuit 18. When the manually operated ON/OFF switch 26 is closed, a second signal is provided to the input terminal 14 of the radio circuit means 12 as a control signal. If the second signal is of a predetermined magnitude and polarity this signal forward biases transistor 20 to supply power to the radio circuit 18 to cause the radio circuit 18 to operate.

The circuit means 28 is operable in first and second states and can advantageously couple or interconnect the timing means 22, the time set means 24, the manually operated switch 26 and the radio circuit means 12 in predefined manner to a radio to provide both nap and sleep type functional operation.

The circuit means 28 generally includes a first means 40 for coupling a first signal provided at the output means 32 of the timing means 22 to the input terminal 14 of the radio circuit means 12 to supply the first signal to the radio circuit means as a control signal. Accordingly, the first means for coupling is useful for implementing and providing for radio circuit means 12 with sleep type functional operation whereby the radio operates for a preselected period of time and then automatically turns itself off. The first means 40 can advantageously include an isolation means such as a diode 42 to block or prevent other signals generated in the circuit from being applied to the output terminal 32 of the timing means 22, and from there to other circuit components, causing the circuit means to operate in an undesired manner.

The current means 28 also includes a second means 44 for coupling the manually operated switch 26 to the input terminal 14 of the radio circuit means 12 to supply the second signal to the radio circuit means 12 as a control signal. Accordingly, the second means for coupling 44 is useful for providing the radio circuit means 12 with ON/OFF functional operation whereby a user can turn the radio ON or OFF as he desires. The second coupling means 44 can advantageously include, as described above, a current limiting resistor 38. The circuit means 28 as disclosed herein is generally operable between or can assume one of two states. In the first state, the circuit means 28 is adapted to supply any first or second signal that is being generated to the input terminal 14 of the radio circuit means 12. In the first state of the circuit means 28, the first and second means for coupling 40 and 44 respectively are generally operable to supply any first or second signals being generated to the input terminal 14 of the radio circuit means 12 as control signals.

The circuit means 28, as will be described below, also advantageously includes means for sinking or diverting signals otherwise supplied to the input terminal 14 of the radio circuit means 12 to suspend, interrupt or prevent, for the duration of a preselected time period, the operation of the otherwise operable radio circuit 18. The circuit means 28, in its second state, is adapted to sink or divert signals otherwise supplied to the input terminal 14 of the radio circuit means 12 to thereby block or prevent these otherwise supplied signals from being supplied as control signals to the input terminal 14 of the radio circuit means 12. The circuit means 28, in its second state, prevents otherwise supplied signals from operating the radio circuit 18 and is therefore useful to provide the radio circuit means 12 with nap type functional operation whereby the operation of an otherwise operating radio is suspended for the duration of a preselected time period.

Accordingly, the circuit means 28 includes means 46 for diverting signals otherwise supplied to the input terminal 14 of the radio circuit means 12 comprising a first means for sinking or diverting signals 48 and a second means for sinking or diverting signals 50. As shown in the illustration of FIG. 1, these first and second means for sinking or diverting signals 48 and 50 can advantageously be implemented by second and third transistor 52 and 54 respectively.

The first means for sinking or diverting signal 48 is responsive to a first signal supplied at the output means 32 of timing means 22 and is adapted to shunt or divert first and second signals otherwise supplied to the input terminal 14 of the radio circuit means 12 in response to the receipt of a first signal. The first sinking or diverting means generally has a first control terminal coupled to the output means 32 of the timing means 30 and second terminal coupled to the input terminal 14 of the radio circuit means 12 and third terminal adapted for coupling to a preselected potential such as ground for coupling, upon the receipt of a first signal as a control signal, the input terminal 14 of the radio circuit means 12 to the preselected potential during the time interval duration of the first signal as a control signal. The first signal is a control signal for the first sinking or diverting means 48 only when the first signal supplied to control terminal is of a predetermined polarity and magnitude. In a preferred embodiment the first sinking or diverting means 48 can advantageously be implemented by a second transistor 52 having a first control terminal coupled to the output means 32 of timing means 22, second terminal coupled to the input terminal 14 of the radio circuit means 12 and a third terminal adapted for coupling a prespecified potential such as ground. In the illustrated embodiment transistor 52 is a NPN transistor connected in a common emitter configuration having a base terminal coupled to the output means 32 of the timing means 22, a collector coupled to the input terminal 14 of the radio circuit means 12 and an emitter coupled to a prespecified potential such as ground. In operation, transistor 52, in response to first signals supplied to its base as a control signal, becomes forward biased to short the input terminal 14 of the radio circuit means to the prespecified potential such as ground to sink or divert signals otherwise supplied to the input terminal 14 of the radio circuit means 12 and thereby prevent the radio circuit means 12 from becoming otherwise operative or if operating to suspend such operation for the time interval duration of the preselected time period during which the first signal is supplied as a control signal. At the termination or conclusion of the first signal being supplied as a control signal the radio circuit means 12 is allowed to become otherwise operative. The first signal ceases to be a control signal when it ceases to be of a prespecified polarity and magnitude at the control terminal. More particularly, the first signal ceases to be a control signal (i) at the conclusion of the prespecified time period when the output means 32 of timing means 30 no longer supplies a first signal as a control signal and (ii) when the second sinking or diverting means 50 sinks or diverts the first signal from the control terminal of the first means 48 for sinking or diverting signals.

The second means 50 for sinking or diverting signals is responsive to first and second signals otherwise supplied to the input terminal 14 of the radio circuit means 12 and is adapted to sink or divert a first signal otherwise supplied to the control terminal of the first means 48 for sinking or diverting signals. The second means for sinking or diverting signals generally has a first control terminal coupled to the input means 14 of the radio circuit means 12, a second terminal coupled to the control terminal of said first sinking or diverting means 48 and a third terminal adapted for coupling to a preselected potential such as ground for coupling, when a first or second signal is supplied as a control signal to its control terminal, the control terminal of the first sinking or diverting means to the preselected potential such as ground for the time interval duration during which either a first or second signal is supplied to the control terminal. The first and second signals act as control signals only when those signals, as supplied to the second sinking means control terminal, are of a predetermined magnitude and polarity. The second sinking means ceases to receive control signals (i) when neither the output means 32 of the timing means 22 supplies a first signal, nor the manually operated ON/OFF switch 26 supplies a second signal and (ii) when the first means 30 for sinking or diverting 48, diverts at least a portion of these signals from the input terminal 14 of the radio circuit means 12 and from the control terminal of the second sinking means. Accordingly, the first sinking means, once caused to operate, can for the time interval duration of the first signal, continue to divert all signals from the control terminal of the second sinking means to block or prevent all these otherwise supplied signals from causing the second sinking means to operate. These otherwise supplied signals can include biasing signals.

The second sinking means 50 in a preferred embodiment, can be a third transistor having a first control terminal coupled to the input terminal 14 of the radio circuit means 12, a second terminal coupled to the control terminal of the first sinking means 48 and a third terminal coupled to a prespecified potential such as ground. In the illustrated embodiment the second sinking means comprises a third NPN transistor 54 connected in common emitter configuration having a base coupled to the input terminal 14 of the radio circuit means 12, a collector coupled to the control terminal of the first sinking means 48 and an emitter adapted for coupling to a prespecified potential such as ground.

In a preferred embodiment, the second sinking means 50 can advantageously be supplied with a bias potential to predispose the second sinking means 50 to an active state to cause the second sinking means to respond first to a signal simultaneously supplied to the control terminals of the first and second sinking means 48 and 50.

The circuit means 28 can also advantageously include a biasing means 55 for supplying a third signal to the control terminal of the second sinking means 50 for suplying the second sinking means with a bias potential sufficient to sully activate the second sinking means 50 and to turn it fully on. In a preferred embodiment wherein the circuit means 28 includes a biasing means 55, the second terminal of the first sinking or diverting means 48 is also coupled to said biasing means for shunting or diverting the third signal from the control terminal of the second sinking means 50 to block or prevent the third signl otherwise supplied to the control terminal of the second sinking means 50 from causing the second sinking means to be active.

In a preferred embodiment illustrated in FIG. 1, the biasing means includes a terminal 56 adapted for coupling to a power supply, a resistor 58, having a first terminal coupled to the terminal 56; and a second terminal coupled to the control terminal of the second sinking means 50 and the second terminal of the first sinking means 48. A current limiting resistor 60 can advantageously be coupled between the control terminal of the second sinking means and the biasing supply resistor 58. Further the second sinking means when implemented by a transistor such as transistor 54, can include a d.c. stability resistor 62 coupled between the first and third terminals of the transistor 54. The control terminal first sinking means 48 can also advantageously be provided with first and second current limiting resistors 64 and 66 respectively. The biasing means can additionally advantageously include an isolation means 68 coupled between the input terminal 14 of the radio circuit means 12 and the second terminal of resistor 58 to prevent third signals supplied at the second terminal of resistor 58 from being otherwise supplied to the input terminal 14 of the radio circuit means 12. In the preferred illustrated embodiment, the isolation means 68 can advantageously be a diode having an anode coupled to the input terminal 14 of the ratio circuit means 12, and a cathode coupled to the second terminal of resistor 58 for blocking third signals supplied at the second terminal of resistor 58 from being supplied to the input terminal 14 of radio circuit means 12.

Accordingly, in operation, the second sinking means 50 is normally active or on and the first sinking means is normally off. The circuit means is thus normally in its first state and can function to permit a user to turn the radio on or off by manual control switch 26 or to cause sleep type operation through second means 36 of the time set means 24.

To achieve nap type operation wherein signals otherwise supplied to the radio input terminal 14 of the radio circuit means 12 are diverted therefrom, the circuit means 28 must be caused to operate in a second state wherein the first sinking means 48 is operative and the second sinking means 50 inoperative.

Accordingly, the circuit means 28 is responsive to the operation of the first means 34 of the time set means 24 and the first means 34 of the time set means 24 provides a signal which causes the circuit means to at least momentarily assume a quasi-second state wherein the second sinking means 50 is inactive and first signals supplied to the control terminal of the first sinking means 48 cause the first sinking means 48 to sink or divert all signals including first, second, and third signals from the input terminal 14 of the radio circuit means 12 and the control terminal of the second sinking means 50 for the time interval duration of the first signal to prevent operation of the radio circuit 18 and the second sinking means 50. Consequently, the first means 34 of the timing set means 24 at least momentarily causes the circuit means to assume a second state which second state is maintained by a first signal supplied at the output means 32 of the timing means 22 to the control terminal of the first sinking means 48. The circuit means 28 is thus responsive to the operation of the first means 34 of the time set means 24 to assume and maintain a second state.

In the illustrated embodiment, the first means 34 of the time set means 24 includes a first switch 70 of the momentarily activatable variety having a first terminal adapted for coupling to a prespecified potential such as grouna and a second terminal coupled by, in a preferred embodiment, a diode isolation means 72, to the control terminal of the second sinking means 50 and the input terminal 14 of the radio circuit means 12. The second terminal of the switch 70 is also coupled through diode isolation means 74 to the input terminal 30 of the timing means 22. It is preferred that the cathodes of diodes 72 and 74 be coupled to the second terminal of switch 70 and to each other to prevent signals from the radio circuit input terminal 14 from being supplied to the input means 30 by the timing means 22 and vice versa. Isolation diodes 72 and 74 also isolate the input terminal 14 of the radio circuit means 12, the control terminal of the second sinking means 50 and the input means of the timing means from the prespecified potential.

Throughout the disclosure and claims of this application the term power supply has been used to provide one skilled in the art with the feel for an operating circuit without unduly burdening him with awkward language. Accordingly, whenever the term power supply is used, it is intended that the term shall also be interpreted to include means for supplying power, such as a terminal or a plurality of terminals adapted for connection to a power supply. Moreover, the appended claims are not intended to be limited in scope to those circuits which are connected to a.c. or d.c. sources but are intended to also cover those circuits capable of being so connected. It will be appreciated that the present invention provides a practical, cost effective, fully electronic circuit for inclusion in a radio for providing programmable clock radio having sleep and nap type function features. The fully electronic circuit of the present invention is particularly attractive because it requires only a single additional pin output for implementing the nap feature. Although the electronic circuit of the present invention has been described with reference to FIG. 1, it is readily apparent that the electronic circuit of the present invention can be used with a variety of different programmable timer and radio circuits including a variety of microprocessors. Additionally, while the present invention has been described in its preferred form with a certain degree of particularity, it is understood that the present disclosure of the preferred embodiment is made by way of example and that modifications of the details of construction may be resorted to without departing from the true spirit and scope of this invention. It is therefore intended that the patent shall cover by suitable expression in the appended claims whatever features of patentable novelty exist in the invention disclosed.

What is claimed is:

1. A programmable clock radio comprising:
    radio circiuit means including a radio circuit and an input terminal, said radio circuit means operating only when a control signal of predetermined polarity and magnitude is supplied to said input terminal of said radio circuit means,
    and control means coupled to said input terminal of said radio circuit means for controlling operation of said radio circuit by selectively supplying a control signal to said input terminal of said radio circuit means in accordance wih the wishes of a user, said control means comprising:
    timing means including input means and output means for providing a first signal at said output means for a selective time interval,
    manually operated ON/OFF switch means for producing a second signal when said ON/OFF switch means is in its ON state,
    circuit means operable between first and second states coupled to said input terminal of said ratio circuit means, said output means of said timing means, and said manually operated ON/OFF switch means, said circuit means in said first state adapted to supply any first or second signal that is being generated to said radio circuit means as a control signal and said circuit means in said second state adapted to block any first or second signals that is being generated from being supplied to said input terminal of said radio circuit means as control signal,
    said control means further comprising manually operated time set means comprising first means coupled to said circuit means and said input of said timing means for establishing a time period during which said timing means produces a first signal at said output means of said timing means, said circuit means being responsive to operation of said first means and the subsequent generation of a first signal to assume and retain its second state throughout the established time period and to thereafter assume its first state,
    whereby neither of said first or second signals can be supplied to said input terminal of said radio circuit means to cause operation of said radio circuit means during the established time period.

2. The programmable clock radio as defined in claim 1 wherein said manually operated time set means further comprises second means coupled to said input means of said timing means for independently establishing a time period during which said timing means produces a first signal at said output means of said timing means,
    said circuit means being responsive to said operation of said second means to supply said first signal provided at said output terminal of timing means to said input terminal of said radio circuit means as a radio control signal during said established time period.

3. The programmable clock radio as defined by claim 1 wherein said circuit means further comprises
    first coupling means for coupling the output means of said timing means to said input terminal of said radio circuit means to supply said first signal to said input terminal of said radio circuit means as a control signal,
    second coupling means for coupling said manually operated switch means to said input terminal of said radio circuit means to supply said second signal to said input terminal of sid radio circuit means as a radio control signal,
    first controllable sinking means coupled to said input terminal of said radio circuit means for shunting signals otherwise supplied to said input terminal of said radio circuit means, said first sinking means having an input terminal coupled to said output means of said timing means and being responsive to said first signals provided at said output means of said timing means, second controllable sinking means coupled to said input terminal of said first sinking means for shunting signals otherwise supplied to said input terminal of said first sinking means, said second controllable sinking means having an input terminal coupled to said input terminal of said radio circuit means and to said first means of said manually operated time set means and being responsive to said first and second signals supplied to said input terminal of radio circuit means and to the operation of said first means of manually operated time set means.

4. The programmable clock radio as defined by claim 3 wherein said first coupling means comprises an isolation means coupled to said input terminal of radio circuit means and said outut means of said timing means for blocking second signals otherwise supplied to said input terminal of said radio circuit means from being supplied to said output means of said timing means, said isolation means supplying said first signals otherwise provided at the output of said timing means to said input terminal of said radio circuit means.

5. The programmable clock radio of claim 4 wherein said isolation means comprises a diode having its anode coupled to said output means of said timing means and its cathode coupled to said input terminal of said radio circuit means.

6. The programmable clock radio as defined by claim 3 wherein said circuit means further comprises biasing means adapted for coupling to a power supply and having a first terminal coupled to said input terminal of said second sinking means for supplying a third signal to said input terminal of said second sinking means, said second sinking means being responsive to said third signal provided at said first terminal of said biasing means, and isolation means coupled to said input terminal of second sinking means and said input terminal of said radio circuit means for blocking said third signal from being supplied to said input terminal of said radio circuit means, said isolation means supplying said first and second signals otherwise supplied to said input terminal of said radio circuit means to said input terminal of said second sinking means.

7. The programmable clock radio as defined by claim 6 wherein said isolation means comprises a first diode having its anode coupled to the input terminal of said radio circuit means and its cathode coupled to said input terminal of said second sinking means.

8. The programmable clock radio of claim 6 wherein said radio circuit means comprises a radio circuit having a first terminal adapted for receiving power to cause said radio circuit to operate a first transistor having a first terminal coupled to said radio circuit, a second terminal adapted for coupling to a power supply and a third terminal coupled to said input terminal of said radio circuit means, said first transistor supplying power to said first terminal of said radio circuit only when a control signal of a polarity and magnitude sufficient to forward bias said first transistor is supplied to said input means of said radio circuit means and said third terminal of said first transistor.

9. The programmable clock radio as defined by claim 8 wherein said first sinking means comprises a second transistor having a first terminal coupled to said input terminal of said radio circuit means, a second terminal coupled to said output means of said timing means and a third terminal adapted for coupling to a first potential, said first transistor being responsive to a first signal supplied at said output means of said timing means whereby only signals of a predetermined magnitude and polarity supplied to said second terminal of said second transistor to cause said second transistor to become forward biased by shunting signals otherwise supplied to said input terminal of said radio circuit means to said second potential.

10. The programmable clock radio as defined by claim 9 wherein said second sinking means comprises a third transistor having a first terminal coupled to said second terminal of said second transistor, a second terminal coupled to said input terminal of said radio circuit means and a third terminal coupled to a third potential, said third transistor being responsive to either first or second signals otherwise supplied to said input terminal of said radio circuit means, whereby only signals of a predetermined polarity and magnitude supplied to said second terminal of said third transistor cause said third transistor to become forward biased, for shunting signals otherwise supplied to said second terminal of said second transistor to said third potential.

11. The programmable clock radio as defined by claim 10 wherein said manually operated time set means first means comprises a normally open, manually operated momentary switch having a first terminal adapter for coupling to ground and a second terminal coupled to said second terminal of said third transistor whereby upon closure of said switch and only for the duration of said closure, said second terminal of said third transistor is shorted to ground and said third transistor does not for the time duration of said closure shunt signals otherwise supplied to said second terminal of said second transistor, and with the occurrence of a first signal at the output means of said timing means during the time duration of said closure, said first signal of a predetermined polarity and magnitude can forward bias said second transistor shunting the input terminal of said radio circuit means and diverting signals which can otherwise cause said radio circuit means to operate.

* * * * *